United States Patent [19]

Ostholt

[11] Patent Number: 5,381,882
[45] Date of Patent: Jan. 17, 1995

[54] TILTABLE TRAY OF A SORTING CONVEYOR INSTALLATION

[75] Inventor: Rudiger Ostholt, Wetter, Germany

[73] Assignee: Mannesmann Aktiengesellschaft, Dusseldorf, Germany

[21] Appl. No.: 129,418

[22] Filed: Sep. 30, 1993

[30] Foreign Application Priority Data

Sep. 30, 1992 [DE] Germany .............................. 4233553

[51] Int. Cl.$^6$ .................................................. B65G 37/00
[52] U.S. Cl. .................................... 198/365; 198/802
[58] Field of Search ............. 198/365, 370, 372, 477.1, 198/802

[56] References Cited

U.S. PATENT DOCUMENTS

| 3,974,909 | 8/1976 | Johnson | 198/365 |
| 4,004,681 | 1/1977 | Clewett et al. | 198/365 |

FOREIGN PATENT DOCUMENTS

| 0540464 | 5/1993 | European Pat. Off. | 198/365 |
| 1182570 | 6/1959 | France | 198/365 |
| 3511936 | 10/1986 | Germany | 98/365 |

Primary Examiner—Cheryl L. Gastineau
Attorney, Agent, or Firm—Cohen, Pontani, Lieberman, Pavane

[57] ABSTRACT

A tiltable tray apparatus of a sorting conveyor installation for depositing unit loads by a swiveling movement from a horizontal transporting position into a tilting position with a conveyor device, on which the tray is arranged by a supporting member which extends in a vertical direction in the transporting position. A ball joint is provided at the supporting member for swiveling movement of the tray, and two knee levers are arranged between the tray and the conveyor device adjacent to the supporting member at both sides thereof as seen in the conveying direction and connected with the conveyor device and the tray by a joint in each instance. The joints at the knee levers have one end constructed as ball joints and another end as hinge joints, each hinge joint having a swivel axis which is aligned parallel to an opposite tilting axis extending through an articulation point of the ball joint of the supporting member and an articulation point of the other knee lever. The articulation points of the ball joints, and center points of the hinge joints situated at the opposite ends of the knee levers and a fastening point of the supporting member each forming corners of an imaginary triangle.

14 Claims, 6 Drawing Sheets

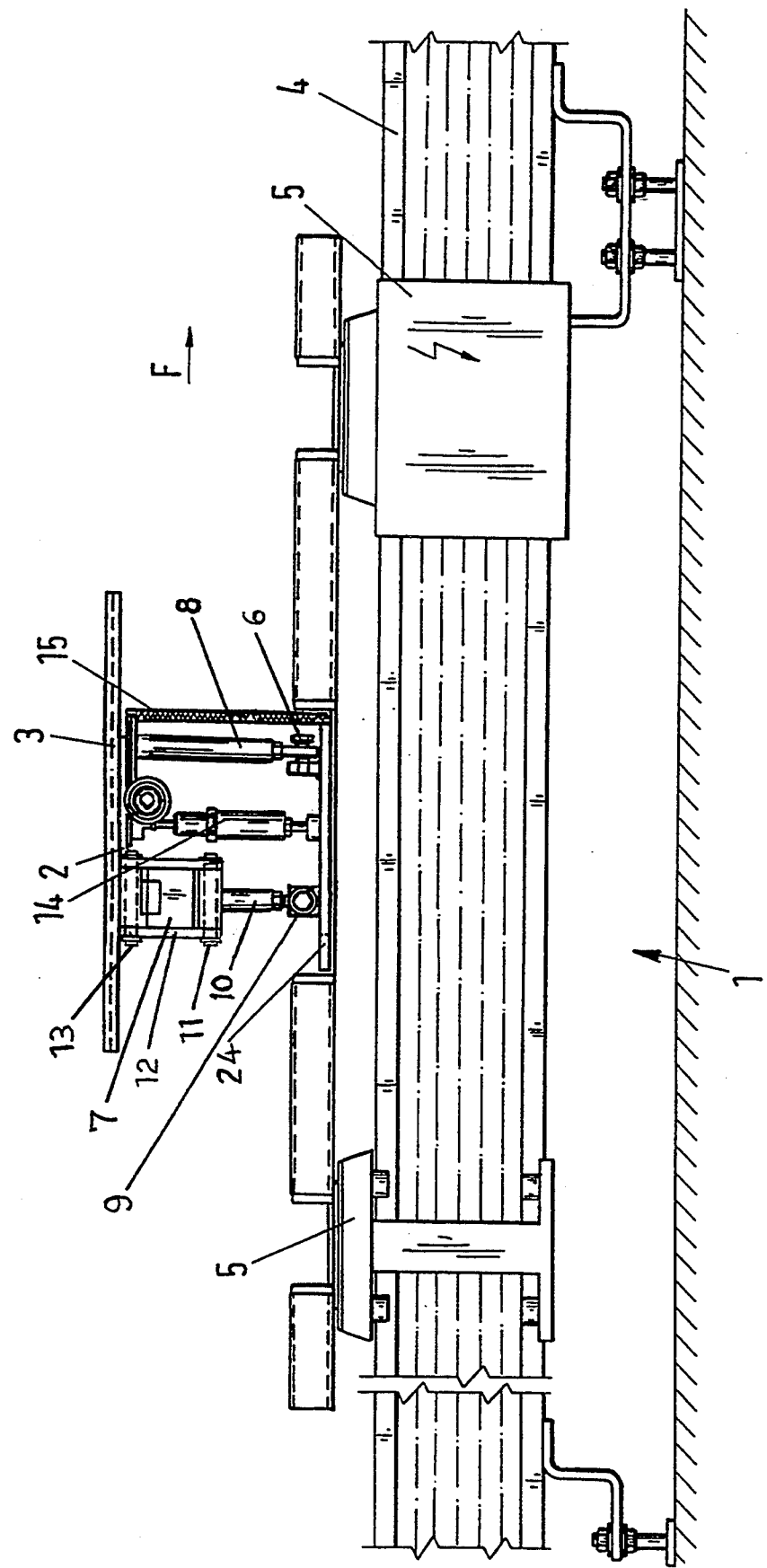

TILTABLE TRAY OF A SORTING CONVEYOR INSTALLATION

BACKGROUND OF THE INVENTION

1. Field of the Invention

The invention concerns a tiltable tray of a sorting conveyor installation for depositing unit loads by means of a swiveling movement from a horizontal transporting position onto a tilting position with a conveyor device on which the tray is arranged.

2. Description of the Prior Art

A tiltable platform or tray of a sorting conveyor installation is known from DE 35 11 936 C2. The sorting conveyor installation essentially includes a plurality of trays which are mostly arranged one directly after the other in the conveying direction and are connected with a conveyor device. The trays are connected with the conveyor device via supporting members, specifically in such a way that they can be tilted transversely to the conveying direction on the one hand and, in so doing, lowered with respect to the supporting member on the other hand. Two knee levers are provided for each tray in addition to the supporting member in order to stabilize the trays in the horizontal transporting position and to execute a movement into an emptying or discharging position which is tilted relative to the transporting position. The knee levers are fastened via joints to the base of the supporting member on the right- and left-hand sides, as seen in the conveying direction, and to the underside of the tray by their other end so as to be at a distance from the tilting axis of the tray. Swivel means, which can be swiveled along guide paths running parallel to the conveying direction, are arranged at the lower ends of the knee levers to produce a controlled tilting process of the tray for depositing the transported unit load onto an adjoining branch conveyor. This causes a folding or bending movement of a preselected knee lever which leads to a tilting movement of the tray in the desired direction. The swivel means of the knee levers are arranged so that when one swivel means is actuated the other swivel means is locked or stopped, since only the knee lever arranged on the side facing the branch conveyor is bent in for the tilting movement. Restoring or reset rollers, for example, can be provided for producing a controlled resetting or righting process of the trays. The reset rollers are arranged one after the other in the conveying direction and so as to ascend proceeding from the discharging station in order to move the tray back into the horizontal transporting position from the discharging position by engaging under the tray as it passes by.

This tiltable platform or tray has proven disadvantageous as the arrangement of the swivel means at the lower ends of the knee levers which project in the direction of the conveyor device increases the overall height. Also, carrying out the lowering process of the tray has proven time-consuming since the knee lever must first be moved out of its rest position in the direction of its extended position before it can be bent in. Moreover, as a result of the lowering of the tilting axis within the supporting member and the slight stretching of the extended knee lever, the unit load merely slides off the tray. Accordingly, a relatively long catching or collecting area is required for the unit load in the region of the discharging station as seen in the conveying direction.

SUMMARY OF THE INVENTION

Proceeding from this prior art, the invention has the object of providing a tiltable tray of a sorting conveyor installation which has a small overall height and simultaneously optimizes the movement by which the unit load is thrown off from the tray.

Pursuant to this object, and others which will become apparent hereafter, one aspect of the present invention resides in a tillable tray of a sorting conveyor installation in which two knee levers and a supporting member are arranged between the tillable tray and the conveyor device via ball joints at one end and, at the other end, so as to be rigid with respect to the supporting member and via hinge joints with respect to the knee lever, the ball joints being aligned in the corner points of an imaginary triangle and the hinge joints being aligned with their swivel axes parallel to the tilting axis extending through the ball joints of the opposite knee lever and supporting member. By means of this arrangement, according to the invention, the tray is guided in the horizontal transporting position and the inclined tilting position with little play. The stable position of the tray in the transporting position brought about by this arrangement enables a reliable transporting of the unit load. Moreover, the tilting axis extending diagonally relative to the conveying direction ensures that the unit load is reliably thrown off by the tilting movement.

It has proven particularly advantageous that the tilting unit, substantially comprising the two knee levers and the supporting member, can be arranged in different positions between the tray and the conveyor device so that the tilting characteristics of the tray can be varied. The various positions can be achieved in that the supporting member is arranged in front or behind on the conveyor device as seen in the conveying direction and the ball joints of the knee levers and supporting member are fastened at the tray or at the conveyor device.

For sorting unit loads, particularly pieces of luggage, the combination of the arrangement of the supporting member at the rear on the conveyor device, as seen in the conveying direction, and the arrangement of the ball joints at the tray has proven advantageous for achieving an accurately aimed tilting off of the unit load. The arrangement of the ball joints at the conveyor device is particularly appropriate for heavy unit loads since, as a result of this arrangement, the tilting angle of the tray is smaller than it would be if the ball joints were arranged at the tray itself, but the lateral deflection of the tray is greater so as to promote a lateral sliding off of the unit load.

The distinguishing characteristic of the arrangement of the supporting member on the conveyor device at the front as viewed in the conveying direction consists in that the unit load is thereby tilted off opposite to the conveying direction into the collecting area of an adjoining branch conveyor and a jamming of the unit load between the tray and, as the case may be, a side wall of the collecting area is accordingly prevented. The symmetrical arrangement of the articulation points of the ball joints of the knee lever with respect to the center line of the tray running parallel to the conveying direction and the symmetrical arrangement of the swivel axes of the hinge joints with respect to the center line of the base plate enable the unit load to be tilted off from either side with the same tilting characteristic. The special construction of the knee levers from an arm which is connected with another frame-like arm via a hinge joint results in a knee lever which is stable with respect to tilting transversely to the swivel axis of the hinge joint due to the wider supporting surface of the frame.

As a result of the arrangement of a spring element and a damping element between the base plate and the tray and the arrangement on the base plate of detent pawls which stop the knee levers, the tray can be righted from the tilting position into the transporting position accompanied by pretensioning of the spring element and the knee lever can then be stopped by the detent pawl. The detent pawl can now be actuated at a desired position within the sorting conveyor installation so as to unlock the knee lever. The knee lever is accordingly bent in due to the accumulated spring force and the tray tilts. The damping element enables a smoothly adjustable tilting speed. The slightly inwardly tilted end position of the knee lever which is achieved in the arrangement of the tray in the transporting position has also proven advantageous, since this ensures that the knee lever is always bent inward in the direction of the supporting member when the detent pawl is actuated.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

FIG. 6 shows a view similar to FIG. 1 of a different embodiment of the invention.

DETAILED DESCRIPTION OF THE PREFERRED EMBODIMENTS

Figure 1:
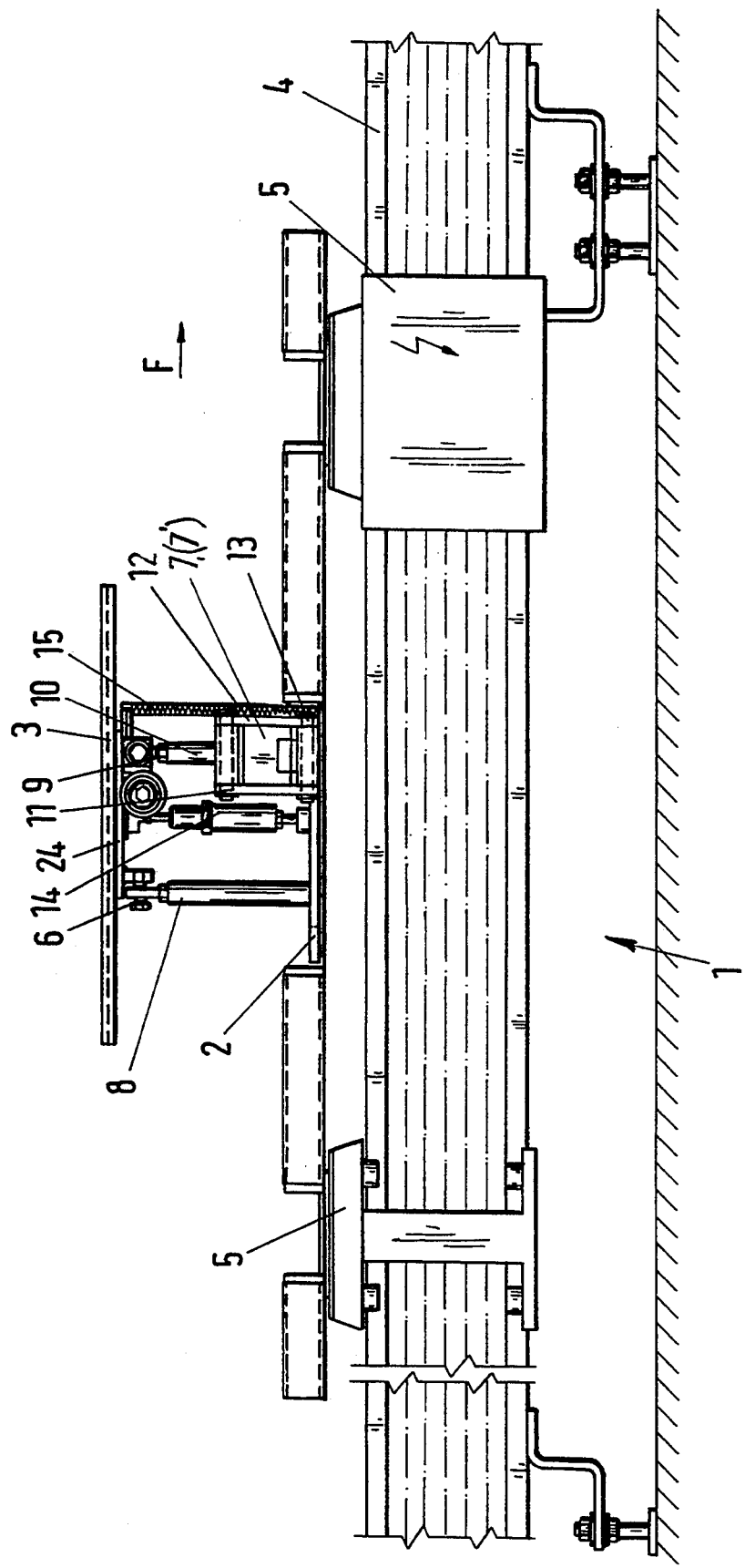
FIG. 1 shows a side view of a sorting conveyor installation with a tiltable tray pursuant to the present invention.

FIG. 1 shows a side view of a sorting conveyor installation essentially comprising a conveyor device 1 with a base plate 2 for receiving a tiltable tray 3. Within the framework of the invention, the word "tray" also refers to a planar platform as well as a transporting surface which is curved or inclined upward only slightly at both sides transversely to the conveying direction F proceeding from the center. The conveyor device 1 is constructed as a monorail with a rail 4 guided on the ground via supports. The monorail essentially comprises a plurality of trolleys 5 engaging around the rail 4 in a U-shaped manner from above. These trolleys 5 are arranged one after the other as seen in the conveying direction F, at least one of them being driven.

A base plate 2 is also supported on the trolleys 5 in an articulated manner and is arranged between every two adjacent trolleys 5. A supporting member 8 extending at right angles to the base plate 2 is fastened on the side of the base plate 2 remote of the trolleys 5. The supporting member 8 is fastened to the base plate 2 at the rear center as viewed in the conveying direction F. A ball joint 6 which is connected via an intermediate plate 24 with the underside of the tray 3 facing the base plate 2 is arranged at the end of the supporting member 8 remote of the base plate 2. The intermediate plate 24 serves to receive the tray 3 and is arranged parallel thereto. In addition, knee levers 7, 7' which are movable around a swivel axis S, S' aligned parallel to the base plate 2 and obliquely with respect to the conveying direction F are supported on the base plate 2. The ends of the knee levers 7, 7' remote of the base plate 2 are likewise connected via ball joints 9, 9' with the underside of the tray 3 via the intermediate plate 24. The knee levers 7, 7' substantially comprise an arm 10, 10' which is connected with a ball joint 9, 9' on one side and with another arm constructed as a frame 12, 12' on the other side via a hinge joint 11, 11'. The frames 12, 12' are articulated at the base plate 2 via additional hinge joints 13, 13' which are movable around the swivel axes S, S'. Moreover, the supporting member 8 and the knee levers 7, 7' are arranged at a distance one behind the other as seen in the conveying direction F. For the sake of simplicity, the knee levers 7, 7' are shown in FIG. 1 with their swivel axes S, S' aligned in the conveying direction F.

Figure 2:
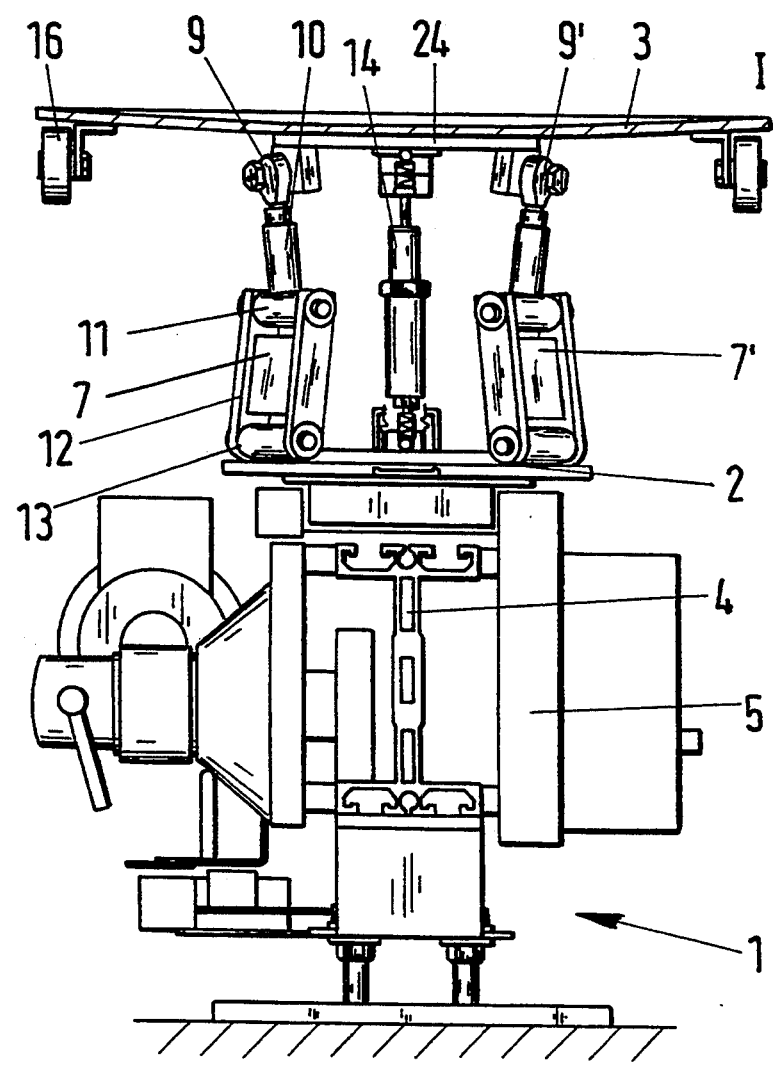
FIG. 2 shows a front view of FIG. 1.
Figure 4:
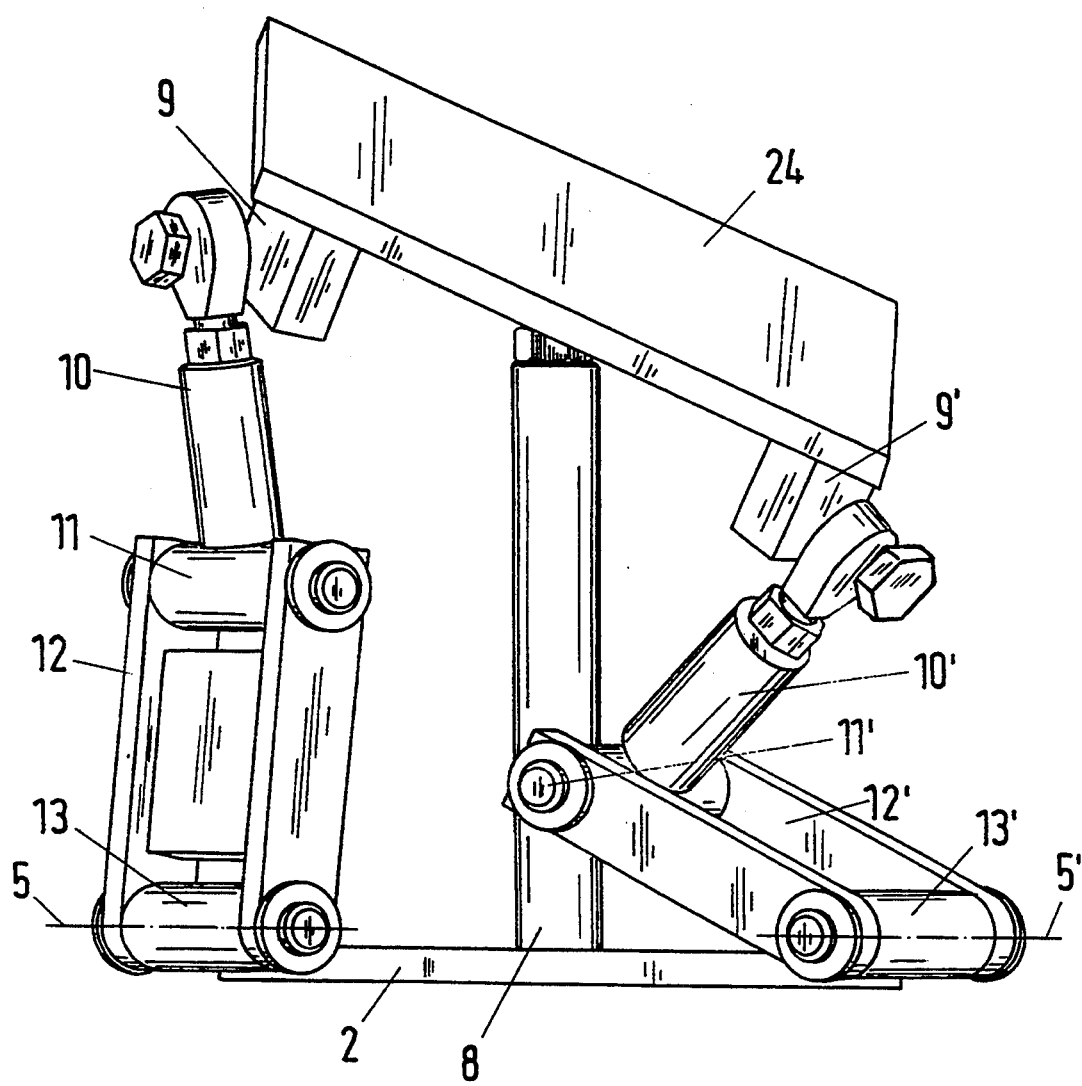
FIG. 4 shows an enlarged section of FIG. 1 from the region of the tiltable tray in the tilting position.
Figure 5:
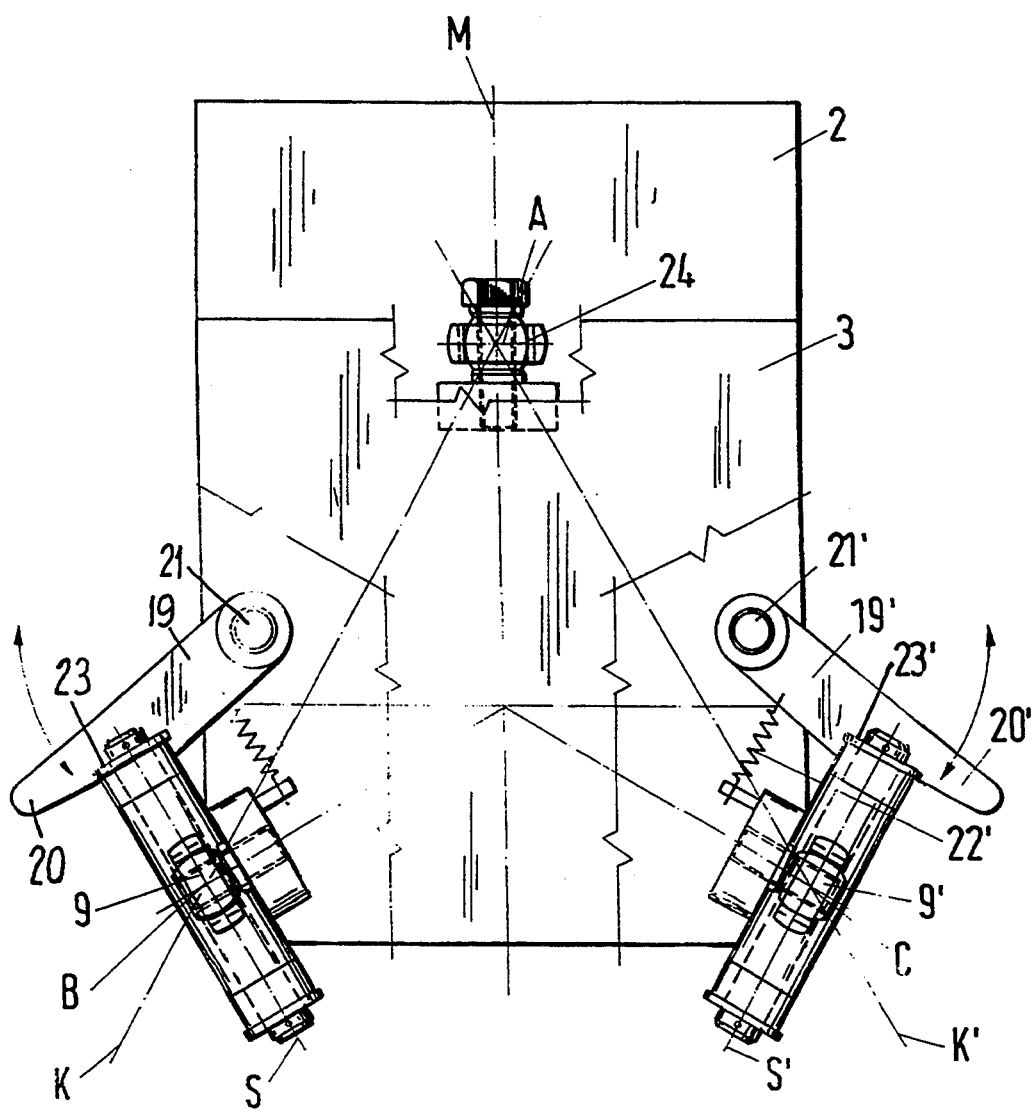
FIG. 5 shows a top view of FIG. 4 in the horizontal transporting position.

The alignment of the swivel axes S, S' relative to the opposite tilting axes K, K', which is part of the invention, is shown in FIGS. 2, 4 and 5.

Further, FIG. 1 shows a damping element 14 which is connected via a ball joint with the sides of the tray 3 and the base plate 2 facing it, and is arranged between the knee levers 7, 7' and behind the supporting member 8 also as viewed in the conveying direction F. Additionally, a spring element 15, which is constructed in particular as a tension spring is fastened between the base plate 2 and the tray 3. The damping element 14 and the spring element 15 are arranged, as viewed in the conveying direction F, so as to be aligned with the supporting member 8 along the center line M (see FIG. 5) of the base plate 2 and conveyor device 1, this center line M extending parallel to the conveying direction F and through the center of the base plate 2. Thus, the base plate 2 is arranged so as to be symmetrical with respect to the longitudinal axis of the rail 4.

In this embodiment, the sorting conveyor installation is described in connection with a tillable tray 3, its supporting member 8 being arranged at the rear on the conveyor device 1, as viewed in the conveying direction F, and its ball joints 6, 9, 9' being connected with the tray. However, with the aim of adapting the tilting characteristics of the tray to the unit load, it is also possible within the scope of the invention to fasten the constructional unit, substantially including the base plate 2, the supporting member 8, the knee levers 7, 7', and the intermediate plate 24, on the conveyor device 1 so as to be turned by 180° in the horizontal and/or vertical direction, as shown in FIG. 6.

It can be seen from FIG. 2, which shows a front view of FIG. 1, that the tray 3 curves away slightly from the base plate 2 toward its sides as seen in the conveying direction F. The tray 3 is shown in the transporting position I, i.e. the tray 3 is aligned parallel to the base plate 2 and directed horizontally. In the transporting position I, the knee levers 7, 7' are positioned so as to be bent in slightly and are accordingly outside of their extended position. Moreover, rollers 16 which are rotatable around horizontal axes and can roll in the conveying direction F are arranged at the underside of the tray in the region of the articulation points of the knee levers 7, 7'. These rollers 16 serve to push the tray 3 out of the tilting position II (see FIG. 4) back into the transporting position I. In the tilting position II, the tray 3 is tilted out of the transporting position I downward to the right or left at an oblique angle to the conveying direction F. Stop rails, for example, are necessary to right the tray again. These stop rails, not shown, which extend parallel to the conveying direction F start to the rear of the discharging station 17, 18 (see FIG. 3) on the level of the roller 16 when the tray 3 is in the tilting position It and, along the course of the conveyor device, ascend to the level of the roller 16 in the transporting position I. The stop rail ends upon reaching this level.

Figure 3:
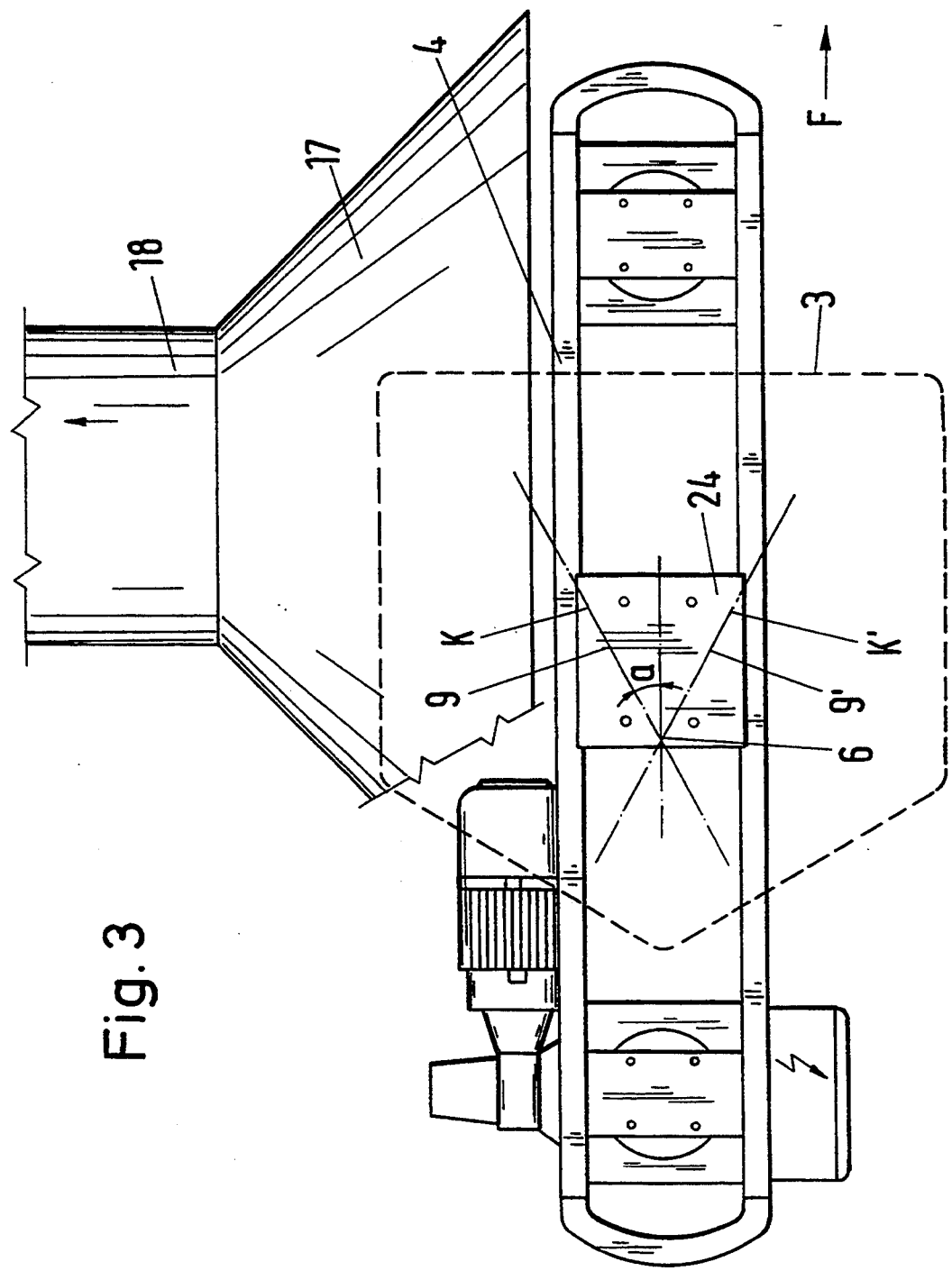
FIG. 3 shows a top view of FIG. 1 with adjoining branch conveyor.

FIG. 3 shows a top view of FIG. 1 and also a collecting area 17 adjoining the sorting conveyor installation 15 for the thrown off unit load which, after the discharging process, is transported further via a discharging conveyor 18 adjoining the collecting area 17. It can also be seen from the top view that the tilting axes K, K' of the tray 3 and intermediate plate 24 are inclined obliquely toward the conveying direction F. The tilting axis K, shown in dashed lines, extends through the joints 6 and 9 and the tilting axis K' extends through the joints 6 and 9'. The angle a enclosed by the tilting axes K, K' and the centerline M is between 15° and 45°, particularly 30°.

FIG. 4 shows an enlarged section of FIG. 2 from the region of the tiltable intermediate plate 24. The tray 3 is not shown and the intermediate plate 24 is shown in the tilting position II, i.e. the intermediate plate 24 is swiveled downward out of the transporting position I around tilting axis K or tilting axis K'. In the tilting position II, the bent in knee lever 7, 7' is supported in the region of its frame 12, 12' by a stop, not shown, which is arranged on the base plate 2 and has a damping support. For the sake of clarity, the damping element 14, spring element 15 and detent pawl 19, which is described in the following, are not shown in this Figure.

It can be seen from FIG. 5 which shows a top view of FIG. 4, but in the transporting position I, that the two knee levers 7, 7' are stopped in the slightly bent in position via detent pawls 19, 19'. The detent pawls 19, 19' are swivelable around an axle 21, 21' arranged vertically on the base plate and are acted upon by a spring 22, 22' in the direction of the frame 12, 12' of the knee lever 7, 7'. The axles 21, 21' are arranged on the side of the hinge joints 13, 13' facing the base plate so as to be slightly offset relative to the hinge joint 13, 13' toward the rear in the conveying direction F so that the detent pawls 19, 19' in the locked state are arranged at an angle of slightly more than 90° relative to the swivel axes S, S' of the hinge joints 13, 13'. The detent pawls 19, 19' have a cut out portion 23, 23' with which the frame 12, 12' of the knee lever 7, 7' is locked. The contour of the cut out portion 23, 23' is adapted to the contour of the longitudinal side of the frame 12, 12', which is tilted inward slightly, so as to support it in a reliable manner. In addition to these cut out portions 23, 23', the detent pawls 19, 19' each have an outwardly directed adjusting lever 20, 20' which projects out over the contour of the base plate 2 and can be unlocked by actuating elements, not shown, arranged in the region of the discharging station. Actuation of the detent pawl 19 for the knee lever 7 causes the knee lever 7 to bend further inward due to the pretensioning between the base plate 2 and the tray 3 caused by the spring dement 15, so that the tray 3 is lowered at the articulation point of the arm 10' at the ball joint 9' and then occupies the position shown in FIG. 4. The tilting movement of the tray brought about by this lowering is executed around a tilting axis K extending through the articulation point A in the center of the ball joint 6 and the articulation point B in the center of the ball joint 9. The damping element 14 takes over the braking or proportioning of this tilting movement (see FIG. 1).

It can also be seen from FIG. 5 that the articulation points A, B, C of the ball joints 6, 9, 9' at the intermediate plate 24 are situated in the corner points of an imaginary triangle, particularly in the corners of an equilateral triangle. The triangle is aligned so as to be symmetrical with respect to the center line M of the base plate 2, wherein the articulation point A of the ball joint 6 lies on the centerline M. The tilting axes K, K' extending through articulation points A and B as well as A and C are aligned so as to be parallel to the opposite swivel axes S, S' of the hinge joints 13, 13' of the knee levers 7, 7' as seen in their vertical projection in the plane of the swivel axes S, S', wherein the articulation point A of the ball joint 6 lies on the center line M. The articulation points B, C coincide with the swivel axes S, S' of the joints 13, 13' arranged on the same side, also as seen in the vertical projection.

The ball joints 6, 9 and 9' are constructed as commercial ball-socket joints. They include a threaded bolt which is screwed together with the arm 10, 10' of the knee lever 7, 7' so as to form an extension thereof. The threaded bolt is provided with a ring eyelet at the end remote of the arm 10, 10', a ball socket being arranged in the opening of this ring eyelet. A ball having two flattened poles connected with one another via a through bore hole is supported so as to slide in this ball socket. Another threaded bolt is supported in the bore hole and is connected with the intermediate plate 24 via another bore hole in a fastening plate which is arranged below the intermediate plate 24 vertically thereto.

The invention is not limited by the embodiments described above which are presented as examples only but can be modified in various ways within the scope of protection defined by the appended patent claims.

I claim:

1. A tiltable tray apparatus of a sorting conveyor installation for depositing unit loads by means of a swiveling movement from a horizontal transporting position into a tilting position, comprising:
    a conveyor device;
    a tray;
    a supporting member connecting the tray to tire conveyor device, the supporting member extending in a vertical direction in the transporting position;
    a ball joint provided at the supporting member for swiveling movement of the tray; and,
    two knee levers arranged between the tray and the conveyor device adjacent to the supporting member at both sides thereof as seen in the conveying direction and connected with the conveyor device and the tray by a joint in each instance, the joints at the knee levers having one end constructed as ball joints and another end as hinge joints, each hinge joint having a swivel axis which is aligned parallel to an opposite tilting axis extending through an articulation point of the ball joint of the supporting member and an articulation point of the other knee lever, each of the ball joints being located on a commonly directed ends of its respective supporting member or knee lever so that the articulation points of the ball joints form corners of an imaginary triangle, and center points of the hinge joints situated at the opposite ends of the knee levers and a fastening point of the supporting member forming corners of another imaginary triangle.

2. A tiltable tray apparatus according to claim 1, wherein the ball joints are arranged at the tray.

3. A tiltable tray apparatus according to claim 1, wherein the ball joints are arranged at the conveyor device.

4. A tiltable tray apparatus according to claim 1, wherein the supporting member is arranged behind the knee levers in the conveying direction.

5. A tiltable tray apparatus according to claim 1, wherein the supporting member is arranged in front of the knee levers in the conveying direction.

6. A tiltable tray apparatus according to claim 1, wherein the tray has a horizontal transporting position, and further comprising a base plate provided so as to connect the hinge joints and the supporting member with the conveyor device, the base plate being arranged parallel to the tray in its horizontal transporting position.

7. A tiltable tray apparatus according to claim 1, wherein the conveyor device has a centerline that extends parallel to the conveying direction, the swivel axes being arranged symmetrically with respect to the centerline of the conveyor device, the fastening point of the supporting member being arranged on the centerline, two of the articulation points being arranged symmetrically with respect to the centerline, and a remaining articulation point being arranged in the course of a vertical projection of the centerline on the tray in the transporting position.

8. A tiltable tray apparatus according to claim 1, wherein each of the knee levers includes a frame and an arm which are connected with one another via a center hinge joint, the frames are connected with the hinge joints at the conveyor device at an end remote of the center hinge joints, the arms being connected with the ball joints.

9. A tiltable tray apparatus according to claim 1, wherein the knee levers are arranged so as to bend inward slightly outside of their extended position when the tray is arranged in the transporting position.

10. A tiltable tray apparatus according to claim 7, and further comprising a damping element and a spring element arranged, in the conveying direction, in front of the supporting member and one behind the other on the centerline, the damping element and the spring element being connected in an articulated manner with an underside of the tray and with the base plate.

11. A tiltable tray apparatus according to claim 10, and further comprising a detent pawl arranged on the base plate so as to be swivelable around an axle arranged vertically with respect to the base plate, the detent pawl having an adjusting lever that faces outward and projects over the base plate as well as a cut out portion directed toward the frame, and still further comprising spring means acting upon the detent pawl in the direction of the frame so that the cut out portion of the detent pawl contacts the frame, the detent pawl longitudinal direction arranged substantially at a right angle to the swivel axes, and stops the frame which is acted upon by a pretensioning force of the spring element.

12. A tiltable tray apparatus according to claim 1, wherein the imaginary triangles have sides proceeding from the supporting member that are equal.

13. A tiltable tray apparatus according to claim 1, wherein the imaginary triangles are equilateral.

14. A tiltable tray according to claim 1, wherein the lengths of the sides of the two imaginary triangles are equal.

* * * * *